United States Patent [19]

Edwards et al.

[11] 4,094,244

[45] June 13, 1978

[54] HAND-HELD BAR CODE LABEL MARKING DEVICE

[75] Inventors: Richard A. Edwards, Alameda; Cecil G. Olson, Castro Valley, both of Calif.

[73] Assignee: Dymo Industries, Inc., San Francisco, Calif.

[21] Appl. No.: 753,422

[22] Filed: Dec. 22, 1976

[51] Int. Cl.² .............................................. B41J 1/44
[52] U.S. Cl. ....................................... 101/66; 101/67; 101/90; 101/110; 101/288
[58] Field of Search ..................... 101/45, 90, 110, 95, 101/96, 99, 66, 67, 288, 289, 291, 292; 156/384–387

[56] References Cited

U.S. PATENT DOCUMENTS

| | | | |
|---|---|---|---|
| 2,351,281 | 6/1944 | Nachemov | 101/110 |
| 3,169,474 | 2/1965 | Howard | 101/110 |
| 3,330,207 | 7/1967 | De Man | 101/45 X |
| 3,640,216 | 2/1972 | Piazza | 101/110 X |
| 3,817,177 | 6/1974 | Van Arnam et al. | 101/288 |
| 3,880,078 | 4/1975 | Pelet | 101/288 |
| 3,926,110 | 12/1975 | Hubbard et al. | 101/288 X |

OTHER PUBLICATIONS

Gilbert, IBM Tech. Discl. Bulletin, vol. 17, No. 5, 10/74, pp. 1320–1321.

Primary Examiner—Edward M. Coven
Attorney, Agent, or Firm—Samuelson & Jacob

[57] ABSTRACT

A hand-held label marking device prints selected bar code character information on labels by scribing selected code bars upon one area of a moving label juxtaposed with a printing medium and prints corresponding alpha-numeric character information upon another area of the label by impacting the label and printing medium against selected print elements, thereby establishing a standard symbol, such as that currently prescribed in the United States by the Universal Product Code. Further alpha-numeric information is printed upon a further area of the label by a reciprocating printing mechanism in the same device to provide consumer-readable price information. A compact arrangement of component parts enables the printing of a full range of bar code character information in accordance with a compact symbol standard such as the zero-suppression symbol standard of the Universal Product Code, together with the corresponding alpha-numeric character information.

23 Claims, 13 Drawing Figures

HAND-HELD BAR CODE LABEL MARKING DEVICE

The present invention relates generally to label marking devices and pertains, more specifically, to a hand-held label marking device for printing bar code character information together with corresponding alpha-numeric character information upon a label.

The recent formulation of the Universal Product Code has resulted in widespread use throughout the United States of the standard machine-readable symbol prescribed in the code. While many products are provided with such machine-readable symbols by manufacturers themselves, a need has arisen for label marking devices which can print standard machine-readable symbols on labels which can be applied to products in generally the same manner as price labels. In this manner it becomes possible to place a standard symbol on any product at the warehouse or at the point of sale. At the same time, it would be advantageous if the label which carries the standard symbol could also be provided with consumer-readable price information.

Hand-held price labeling devices have gained acceptance as convenient tools for placing labels on products at a variety of locations. Much work has gone into the development of label stocks and the mechanisms for handling and applying labels with these devices. In providing hand-held label marking devices for printing bar code symbols, it would be advantageous if these label stocks and mechanisms could be used so as to maintain continuity and compatibility with those devices now in use for printing ordinary price labels.

Because present price labels have limited space available for printing a bar code symbol, a compact symbol must be employed. One of the more compact available symbols is the zero-suppression version of the Universal Product Code symbol. The zero-suppression symbol is described fully in the UPC Symbol Specification published by Distribution Codes, Inc., administrator of the Universal Product Code and UPC symbol for the Uniform Product Code Council. As described therein, the symbol employs six characters, in addition to left-hand and right-hand guard patterns. Three of the characters are encoded in odd parity and three in even parity. The values of the number system category and the modulo check character are derived from the parity permutation of the six encoded characters, the permutation being chosen in accordance with the parity patterns prescribed in the standard. It will be apparent, then, that a device for printing the zero-suppression symbol must be capable of printing six characters, each one of which can be chosen from a total of twenty variations representing ten character values in either odd or even parity code.

It is therefore an object of the invention to provide a hand-held label marking device capable of marking a label with selected bar code character information, together with corresponding alpha-numeric character information, in accordance with prescribed standards, in a compact format upon a given area of the label.

Another object of the invention is to provide a label marking device in which selected bar code character information is printed upon a label by scribing with scribe elements and a juxtaposed printing medium, and alpha-numeric character information corresponding to each bar code character is printed by impacting the label and the juxtaposed printing medium with alpha-numeric print elements.

Still another object of the invention is to provide a compact label marking device capable of marking a label with selected bar code character information, together with corresponding alpha-numeric character information, in accordance with the zero-suppression version of the Universal Product Code symbol.

A further object of the invention is to provide a hand-held label marking device which, in addition to marking a given area of a label with selected bar code character information, and corresponding alpha-numeric character information, can mark a further area of the label with consumer-readable price information.

A still further object of the invention is to provide a hand-held label marking device of the type described which is relatively versatile in that it permits a broad range of use, yet is relatively easy to use.

Another object of the invention is to provide a hand-held labeling device of the type described having a construction which enables one-hand manual operation with ease.

Still another object of the invention is to provide a hand-held label marking device of the type described which utilizes currently available label stock.

A further object of the invention is to provide a hand-held label marking device which is economically manufactured of a minimum number of readily fabricated component parts.

The above objects, as well as further objects and advantages, are attained by the present invention, which may be described briefly as a label marking device for printing selected bar code and alpha-numeric character information upon a label, the device comprising a frame, a printing station on the frame, a supply of labels, a printing medium, a plurality of scribe elements mounted on the frame for location of selected scribe elements, corresponding to selected bar code character information, at a first location at the printing station, a plurality of print elements mounted on the frame for location of selected print elements, corresponding to selected alpha-numeric character information, at a second location at the printing station, pressure means mounted on the frame for placement at the first location, impact means mounted on the frame for placement at the second location, and actuating means on the frame capable of actuation through a cycle of operation for moving a label, from the supply, together with a portion of the printing medium juxtaposed with the label, between the pressure means and the selected scribe elements at the first location while urging the pressure means to press the juxtaposed label and printing medium against the scribe elements to scribe information on the label in the form of a bar code having code bars running parallel to the direction of movement of the label during a first portion of the cycle, and actuating the impact means to impact the juxtaposed label and printing medium with the selected print elements at the second location to print information on the label corresponding to the selected alpha-numeric characters during a second portion of the cycle.

In addition, where the bar code character information is printed in accordance with a prescribed standard, the invention provides a plurality of bar code character wheels mounted side-by-side for rotation about a common first axis to enable indexing of each wheel for the selection of a particular bar code character, each bar code character wheel having a plurality of first elements providing bar code character representations located along the periphery of the wheel, each bar code character wheel having a plurality of tooth-like first lobes spaced around the periphery of the wheel, the number of first lobes corresponding to the number of bar code character representations on the wheel, each first lobe having a crown and each bar code character representation being located upon the crown of a first lobe, a plurality of selectors mounted side-by-side for movement adjacent the bar code character wheels, the number of selectors corresponding to the number of character wheels, each selector having a plurality of first recesses, each first recess having a bottom, the number of first recesses in each selector corresponding to the number of first lobes on each bar code character wheel, the first recesses being generally complementary to the first lobes such that the first lobes are received within the first recesses to enable indexing of each bar code character wheel by movement of a corresponding selector; and each selector carrying viewable alpha-numeric character representations corresponding to the bar code characters represented on the corresponding bar code character wheel.

Where the standard symbol is the zero-suppression version of the UPC symbol, wherein a modulo check character value is obtained through a specific odd and even parity pattern among the characters of the symbol, each bar code character wheel has twenty first lobes carrying twenty bar code character representations representing ten character values each in odd and even parity.

The invention will be more fully understood, while still further objects and advantages will become apparent, in the following detailed description of an embodiment of the invention illustrated in the accompanying drawing, in which:

Figure 1:
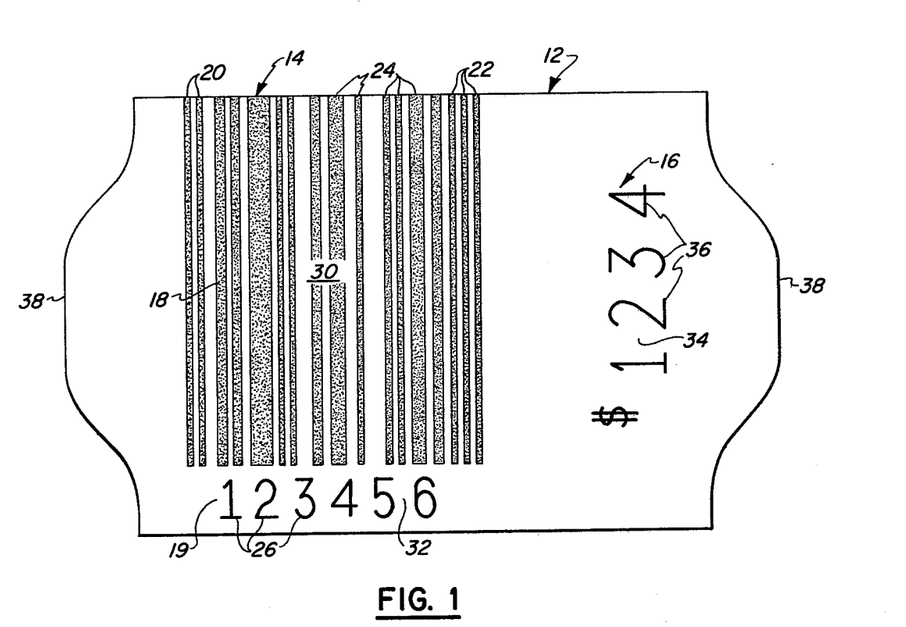
FIG. 1 is a plan view of a label marked with bar code character information, corresponding alpha-numeric character information, and consumer-readable price information, all as placed on the label by a device constructed in accordance with the invention.

Referring now to the drawing, and especially to FIG. 1 thereof, a label 12 is shown marked with a machine-readable symbol 14 on the face thereof and consumer-readable price information at 16. Symbol 14 includes bar code character information 18 and alpha-numeric character information 19 in the form of numerals corresponding to the bar code character information 18.

The particular illustrated symbol 14 is a standard symbol which complies with the zero-suppression version of the Universal Product Code symbol, as described above. Symbol 14 includes two left-hand guard bars 20, three right-hand guard bars 22, and a plurality of code bars 24 representing the six characters of the symbol. The six characters are represented in the form of alpha-numeric characters at 26. As can be seen in FIG. 1, the code bars are placed upon a first area 30 of the label 12 and the alpha-numeric characters are placed in a second area 32. A third area 34 of the label 12 carries consumer-readable price information in the form of alpha-numeric characters 36.

Label 12 is of readily available label stock having an edge configuration at opposite edges 38 and a pressure-sensitive adhesive layer (not shown) on the back thereof, as described in U.S. Pat. No. 3,503,834. The label stock is available in strips of indeterminate length carrying contiguous labels and supplied in rolls capable of being received within a variety of label marking devices.

Figure 2:
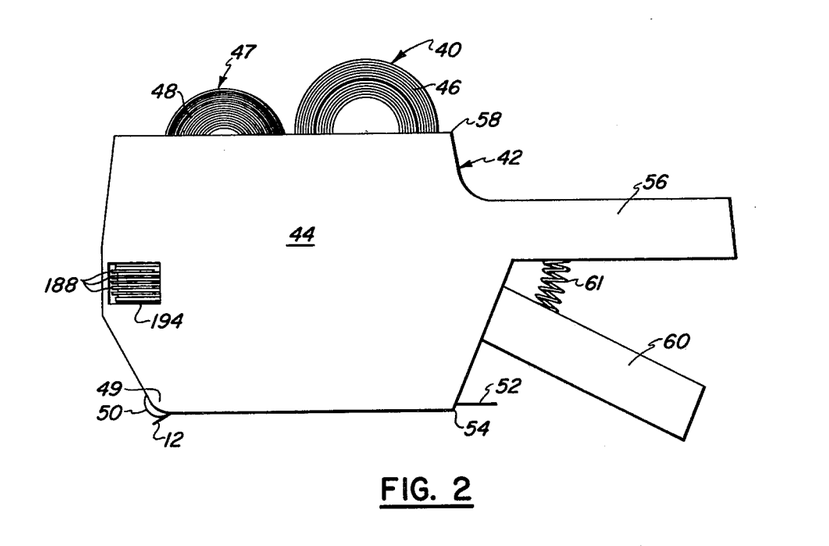
FIG. 2 is an elevational view of a label marking device constructed in accordance with the invention.

One such roll 40 is seen mounted in a label marking device 42 illustrated in FIG. 2. Label marking device 42 is constructed in accordance with the invention and includes a frame 44 which carries both the roll 40 of labels in a strip 46 and a printing medium, shown carried in a roll 47 of tape 48, such as a carbon ribbon tape. Printed labels 12 emerge from the lower front corner 49 of the frame 44, beneath an applicator 50 for subsequent application to the article to be labeled. Applicator 50 is illustrated in the form of a roller, as described in U.S. Pat. No. 3,265,553. The label strip 46 includes a carrier web 52 which carries the contiguous labels 12 and which is separated from the labels to emerge at the lower rear corner 54 of the frame 44, as will be explained in greater detail hereinafter.

A fixed handle 56 projects rearwardly adjacent the upper rear corner 58 of the frame 44. An actuating means in the label marking device 42 includes an actuating lever 60 projecting rearwardly from the frame 44 beneath the fixed handle 56. Actuating lever 60 is biased toward the rest position shown in FIG. 2 by resilient biasing means in the form of a helical spring 61 extending between the fixed handle 56 and the actuating lever 60 (also see FIG. 4).

Figure 3:
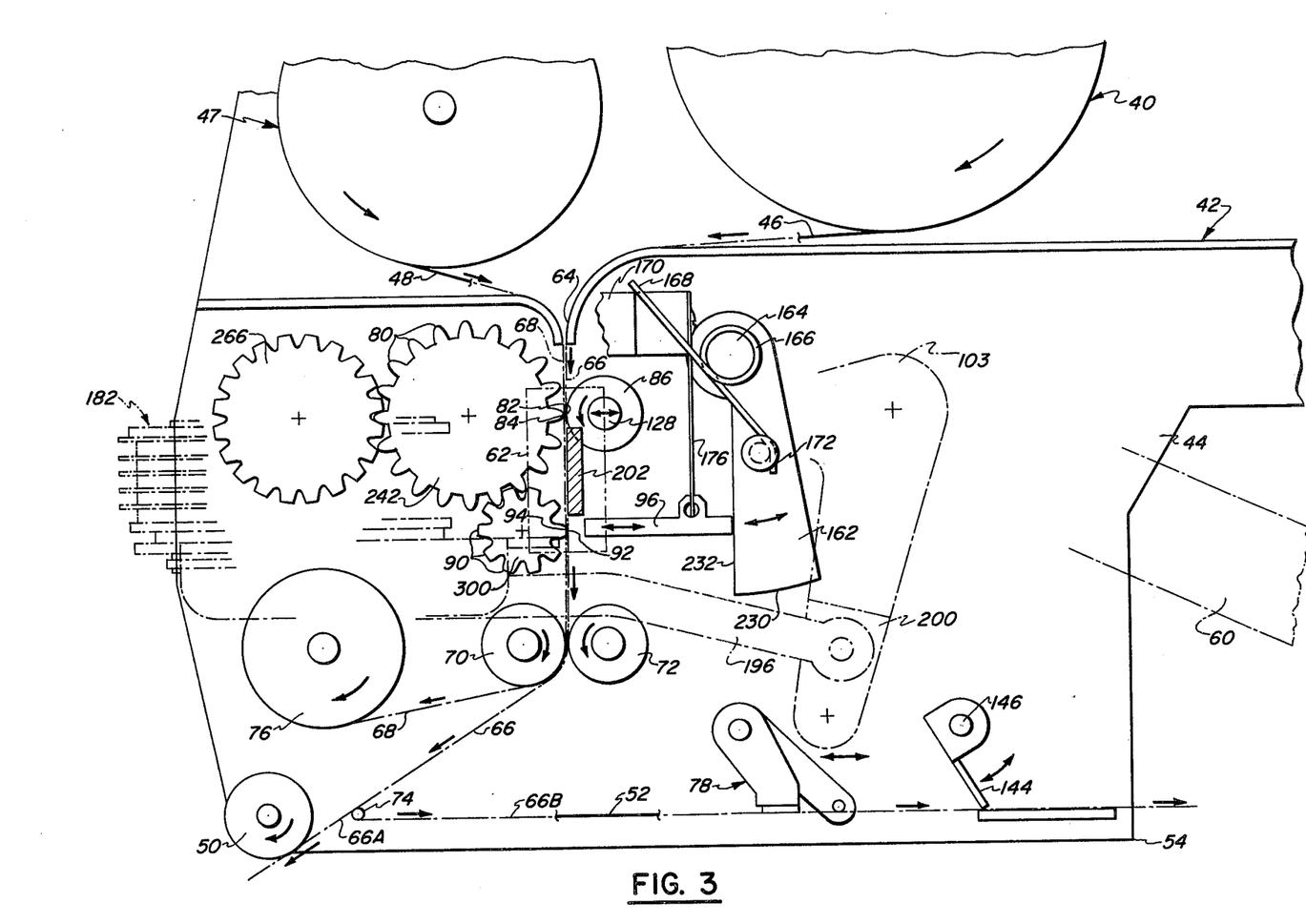
FIG. 3 is an enlarged, mostly diagrammatic illustration of the general layout and operation of the device.

Turning now to FIG. 3, the general layout and operation of label marking device 42 is illustrated diagrammatically. Frame 44 has a printing station 62 thereon. The label strip 46 and the tape 48 pass from rolls 40 and 47, respectively, to a guide 64 wherein the strip 46 and tape 48 are juxtaposed to follow contiguous paths of travel 66 and 68, respectively, through the printing station to a feed means, in the form of a pair of feed rollers 70 and 72 which can be rotated in the direction indicated by the arrows to draw the strip 46 and tape 48 through the printing station 62.

Beyond the feed rollers 70 and 72, in the direction of travel of the strip 46 and tape 48, the paths of travel 66 and 68 diverge, with path 66 leading to a label separating element in the form of pin 74 and path 68 leading to a take-up reel 76. As the strip 46 passes over the pin 74, each label 12 is partially separated from the carrier web 52 and follows path 66A to be placed beneath applicator 50 for subsequent application to an article, as exemplified in U.S. Pat. No. 3,265,553. The carrier web 52 continues along path 66B to a further feed means in the form of a hitch-feed mechanism 78 to emerge as waste material from the lower rear corner 54 of frame 44.

Marking of the labels 12 takes place at the printing station 62. A plurality of scribe elements 80 are mounted upon the frame 44 (also see FIG. 5) in such a way as to enable selection of desired scribe elements for placement at a first location 84 in the printing station 62. As will be described in greater detail below, the scribe elements 80 correspond to the bar code character information in the form of code bars 24. Of all of the available scribe elements 80, those which have been selected for placement at location 84 are referred to herein as selected scribe elements 82. Pressure means in the form of a platen roller 86 is also located at the first location 84 and is movable laterally toward and away from the selected scribe elements 82. When the platen roller 86 is urged toward the selected scribe elements 82, the selected scribe elements will press and continue to urge the printing medium of tape 48 against the juxtaposed face of a label 12 in strip 46 and, as the strip 46 and tape 48 are advanced past the fixed scribe elements 82 by actuation of the feed rollers 70 and 72, code bars 24 will be scribed upon the face of the label in a direction parallel to the direction of movement of the label. At the same time, the left-hand guard bars 20 and the right-hand guard bars 22 are scribed by fixed scribe elements 88 (see FIGS. 4 and 5) located at the sides of the selectable scribe elements 80.

A plurality of print elements 90 are mounted upon the frame 44 (also see FIG. 6) in such a way as to enable selection of desired print elements for placement at a second location 94 in the printing station 62. Location 94 is adjacent to but spaced from location 84. As will be described in greater detail below, the print elements 90 correspond to alpha-numeric character information in the form of characters 26. Of all of the available print elements 90, those which have been selected for placement at location 94 are referred to herein as selected print elements 92. Impact means in the form of a striker 96 is mounted on the frame 44 for movement toward and away from the paths of travel 66 and 68 of the strip 46 and tape 48 at the second location 94 and is actuated upon completion of the advancement of a label 12 through the first location 84 to the second location 94, and while the strip 46 and tape 48 are stationary, to strike the juxtaposed printing medium of tape 48 and face of label 12 momentarily against the selected print elements 92 with a force great enough to print the characters 26 upon the label. In this manner, a complete symbol 14, including code bars 24, guard bars 20 and 22 and characters 26, is printed within the first and second areas 30 and 32 upon the face of each same label 12. Printing of the consumer-readable price information in the third area 34 will be described below.

Referring now to FIGS. 4 through 8, actuation of the feed means and pressure means for advancing and scribing a label 12, and actuation of the impact means for impact printing upon the label are accomplished by the actuating means which includes the actuating lever 60 mounted upon frame 44 for pivotal movement relative thereto and coupled to the feed means and the pressure means by coupling means which will now be described. Actuating lever 60 is affixed to a main drive shaft 100 journaled for rotation upon frame 44 and carrying a pair of drive cranks 102 and 103 affixed to the drive shaft 100 adjacent the ends thereof.

Each drive crank 102 and 103 has a first crank arm 104, carrying camming means in the form of a cam surface 106. Drive crank 102 also has a second crank arm 108 pinned to a link 110 at 112. Link 110 is supported upon the frame 44 for sliding movement forward and backward, in the directions indicated by the arrow in FIG. 4, by a guide 113 and carries a rack 114. Rack 114 is meshed with a pinion 116 affixed adjacent one end of a shaft 118 journaled for rotation upon frame 44 and carrying feed roller 72 for rotation therewith. Feed roller 70 is journaled for rotation upon a bracket 120, adjacent one end thereof, and carries a first gear 122 which is meshed with a second gear 124 carried by feed roller 72. Bracket 120 itself is mounted upon a transverse shaft 126 for pivotal movement relative to frame 44. Platen roller 86 is journaled for rotation upon the bracket 120 adjacent the other end of the bracket 120 by means of a platen shaft 128 which passes through the bracket 120 and carries a cam follower 130 at each end thereof (see FIG. 5).

Figure 4:
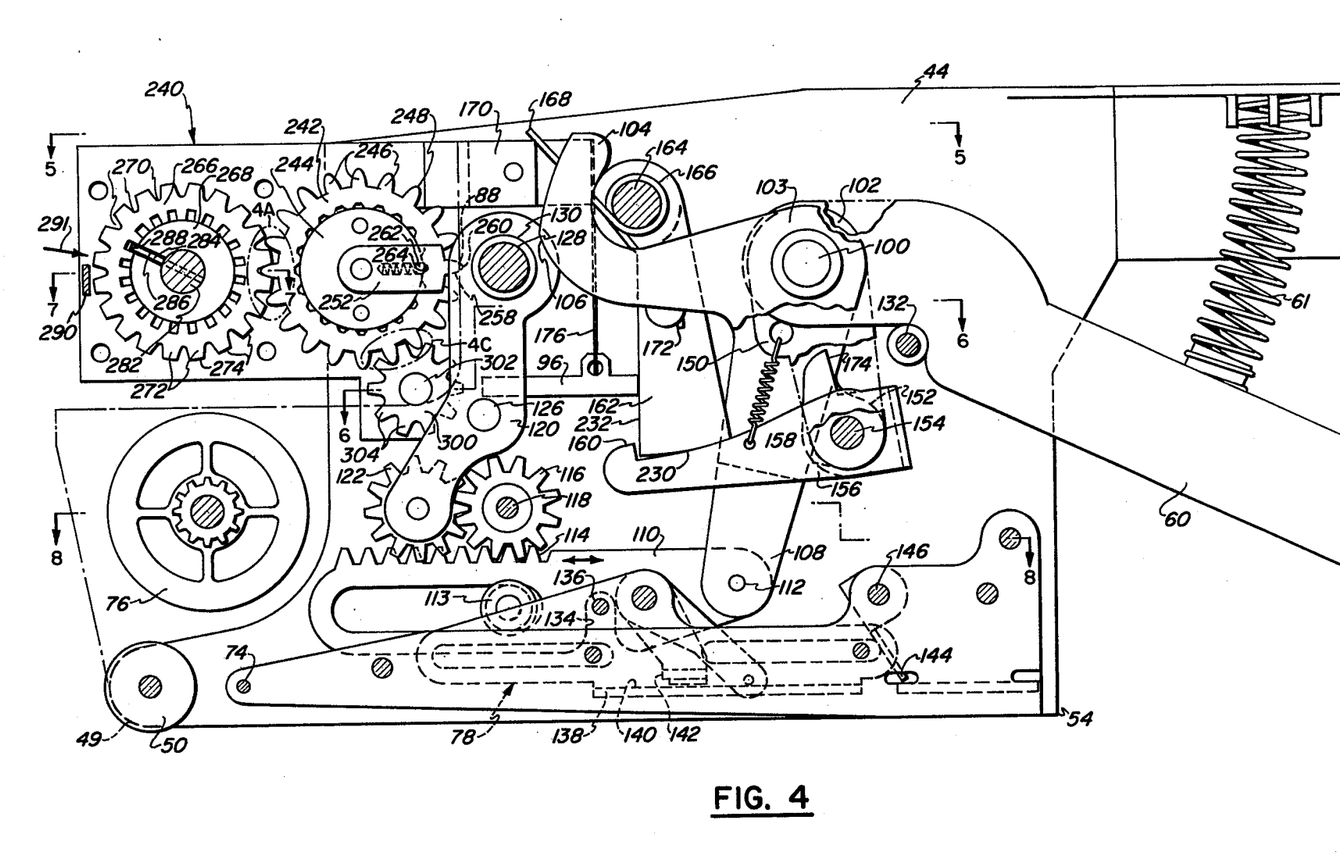
FIG. 4 is an enlarged fragmentary elevational view similar to FIG. 2, but with portions removed to illustrate working component parts.

As seen in FIG. 4, actuating lever 60 is at the rest position, biased against a stop post 132 by helical spring 61. In order to actuate label marking device 42, actuating lever 60 is depressed; that is, actuating lever 60 is pivoted toward fixed handle 56, against the bias of helical spring 61. Such movement of actuating lever 60 will rotate drive shaft 100 in a counterclockwise direction, as viewed in FIG. 4, thereby rotating drive cranks 102 and 103 counterclockwise and pulling link 110 rearwardly (to the right, as viewed in FIG. 4). Such movement of the link 110, and the corresponding movement of rack 114, will rotate the feed rollers 70 and 72, via pinion 116 and gears 122 and 124, to commence advancement of the juxtaposed label strip 46 and tape 48, which are gripped between the feed rollers. Further movement of actuating lever 60, and concomitant rotation of drive cranks 102, will engage cam surfaces 106 with corresponding cam followers 130, driving the cam followers 130 forward, thereby rocking bracket 120 in a counterclockwise direction about transverse shaft 126 and urging the platen roller 86 toward the selected scribe elements 82. At the same time, rocking of the bracket 120 in the counterclockwise direction urges feed roller 70 toward feed roller 72 to increase the gripping forces upon the advancing label strip 46 and tape 48. Continued depressing movement of the actuating lever 60 will continue rotation of the feed rollers 70 and 72, and the concomitant advancement of the strip 46 and tape 48 through the printing station 62, while the cam surfaces 106 continue to engage the cam followers 130 and urge the platen roller 86 against the selected scribe elements 82 with the appropriate pressure for obtaining the desired scribed code bars. Each increment of advancement of strip 46 and tape 48 is equal to the length of one label 12.

Link 10 is coupled to the hitch-feed mechanism 78 by means of a slot 134 in link 110 which engages a pin 136 projecting from a carrier slide 138 of the hitch-feed mechanism 78. The carrier slide 138 includes a platform 140 over which the web 52 passes and to which the web 52 is clamped by a clamp arm 142 pivoted upon the carrier slide 138. As the link 110 moves rearwardly and the feed rollers 70 and 72 feed the strip 46 and tape 48 along their respective paths of travel, carrier slide 138 moves rearwardly, drawing web 52 along its path of travel toward the lower rear corner 54 of frame 44. Upon return movement of link 110 in the forward direction, carrier slide 138 also moves in a forward direction. Clamp arm 142 tends to slide over the web 52 which is restrained from movement in a forward direction away from the lower rear corner 54 by a brake 144 pivoted about a fixed axis at 146.

Figure 5:
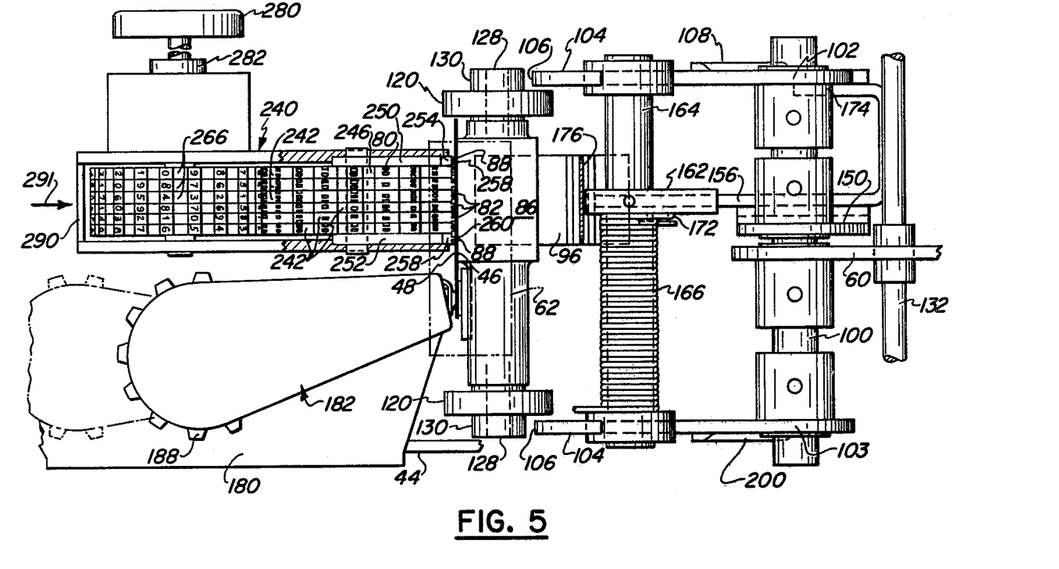
FIG. 5 is a fragmentary cross-sectional view taken along line 5—5 of FIG. 4.
Figure 6:
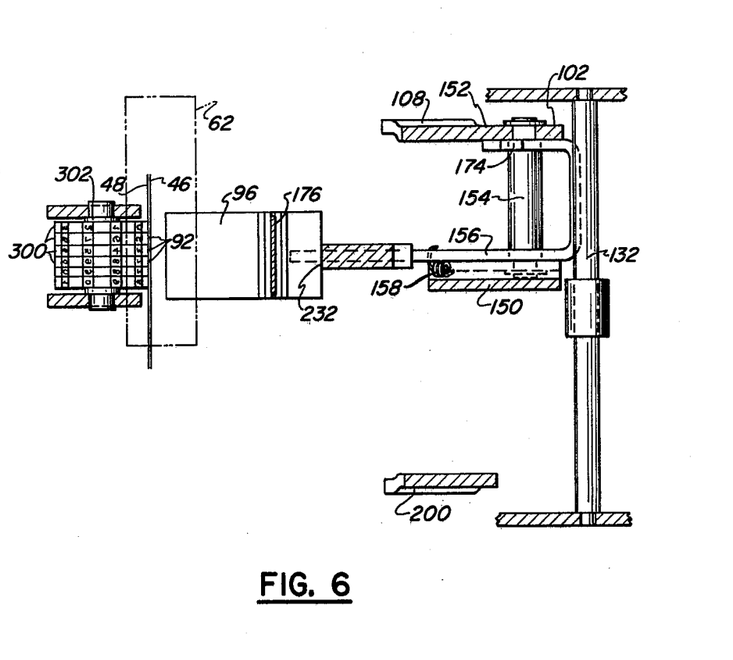
FIG. 6 is a fragmentary cross-sectional view taken along line 6—6 of FIG. 4.

As best seen in FIGS. 4, 5 and 6, drive shaft 100 carries a further crank 150 affixed to drive shaft 100 for rotation therewith. Second crank arm 108 of drive crank 102 is provided with a rearward extension 152, and a pin 154 extends between further crank 150 and the extension 152 of crank arm 108. A latch 156 is mounted for pivotal movement upon pin 154 and is biased upwardly, toward crank 150, by a spring 158 extending between the latch 156 and the crank 150. A latch tooth 160 is located at the forward end of the latch 156 in position to engage a hammer 162 mounted for pivotal movement upon a strut 164 affixed to the frame 44. A power spring 166 is coiled about the strut 164 and has a first end 168 resting against a block 170 carried by the frame 44 and a second end 172 affixed to the hammer.

As the actuating lever 60 is moved from the rest position toward the depressed position, drive crank 102 and further crank 150 rotate in a counterclockwise direction (as viewed in FIG. 4), moving pin 154 rearwardly and drawing latch 156 rearwardly. Latch tooth 160 will then engage the hammer 162 and rotate the hammer in a counterclockwise direction, thereby winding power spring 166 and cocking the hammer. As the actuating lever 60 approaches the depressed position, a finger 174 on the latch 156 engages stop post 132 and, upon the actuating lever 60 reaching the fully depressed position, the latch 156 is pivoted by a finger 174 to disengage latch tooth 160 from hammer 162, thus freeing the cocked hammer for clockwise movement under the influence of power spring 166. Striker 96 is suspended in the path of travel of hammer 162 by means of a relatively flexible leaf spring 176 secured to the frame 44. Hammer 162 will thus strike the striker 96 and cause the striker to move forward with a force sufficient to impact the now stationary strip 46 and tape 48 against the selected print elements 92 to print the characters 26 upon the label located in the printing station 62.

Figures 4A, 4B, 4C, 8:
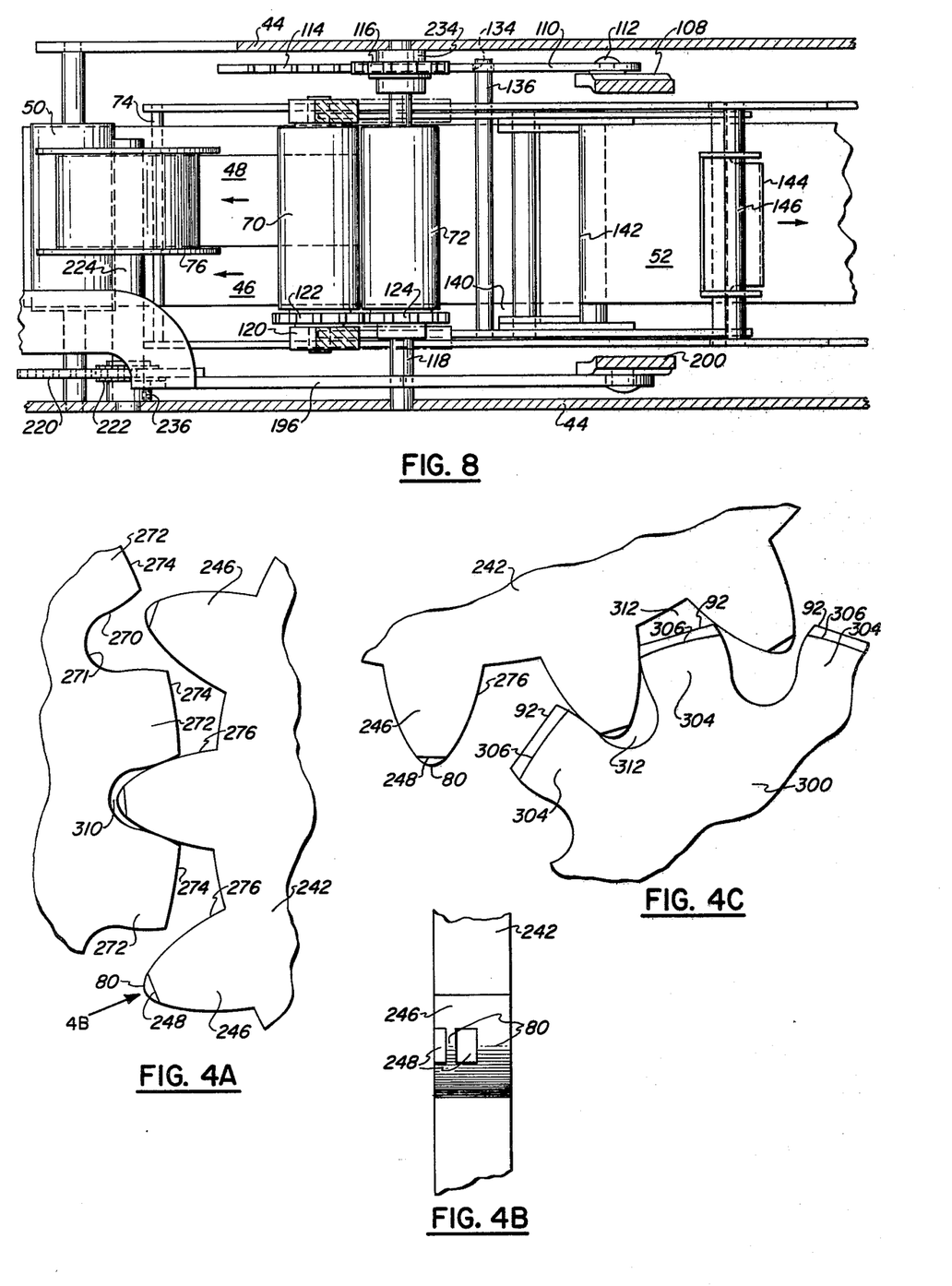
FIG. 4A is an enlarged fragmentary view of a portion of FIG. 4 indicated at area 4A in FIG. 4, and appears in the same sheet with FIG. 8.
FIG. 4B is a fragmentary view of the crest of a lobe of a bar code character wheel illustrated in FIG. 4A, viewed in the direction of the arrow in FIG. 4A, and appears in the same sheet with FIG. 8.
FIG. 4C is an enlarged fragmentary view of another portion of FIG. 4 indicated at area 4C in FIG. 4, and appears in the same sheet with FIG. 8.
FIG. 8 is a fragmentary cross-sectional view taken along line 8—8 of FIG. 4.
Figure 9:
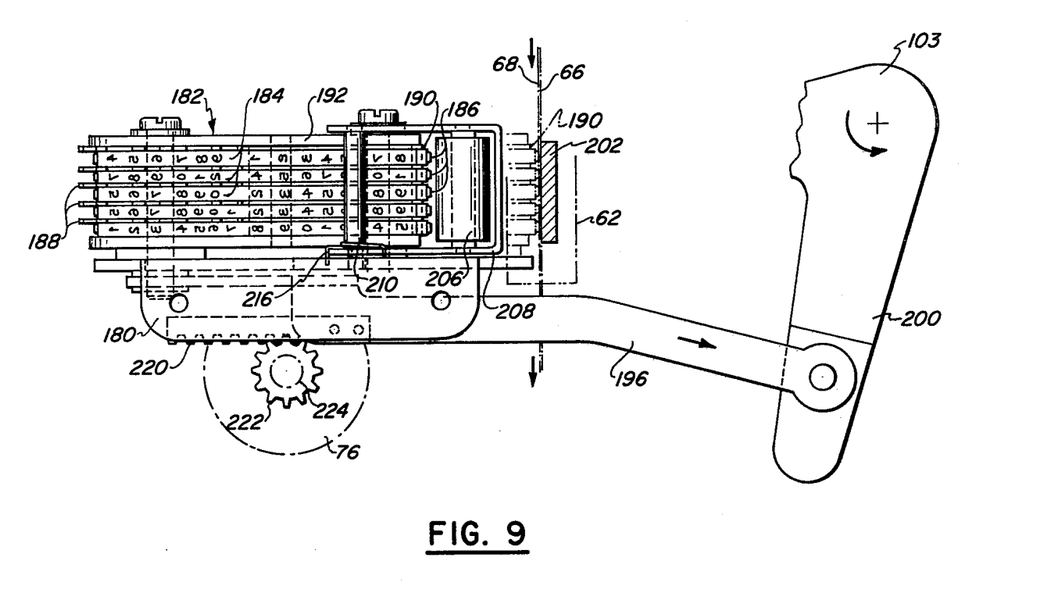
FIG. 9 is a fragmentary elevational view taken in the direction of the arrow in FIG. 5 showing the operation of a printing mechanism in the device.
Figure 10:
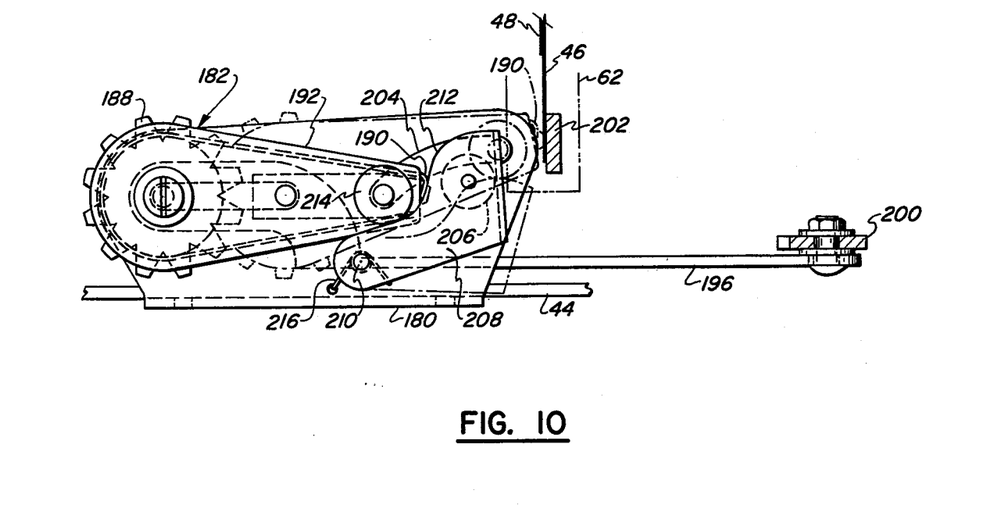
FIG. 10 is a plan view of the mechanism of FIG. 9.

The alpha-numeric characters 36 representing the consumer-readable price information are also printed upon each label 12 in the printing station 62 upon depression of the actuating lever 60. Referring now to FIGS. 8, 9 and 10, as well as to FIGS. 3, 4 and 5, a sub-frame 180 is secured to the main frame 44 forward of the printing station 62 and carries an alpha-numeric printing mechanism in the form of ink-printing mechanism 182 of the type having a plurality of endless bands 184 each carrying a plurality of raised character printing elements 186. The bands 184 may be indexed individually by manually rotating selector wheels 188 to place the selected printing elements at the nose 190 of a carriage 192 upon which the bands are carried. Wheels 188 are accessible through an opening 194 (see FIG. 2) in the frame for manual rotation.

Carriage 192 may be reciprocated upon sub-frame 180 between a rest position, shown in full lines in FIGS. 9 and 10 (and in phantom in FIG. 5), and a printing position, shown in phantom in FIGS. 9 and 10 (and in full lines in FIG. 5). A link 196 connects the carriage 192 with a second crank arm 200 of drive crank 103. Upon movement of the actuating lever 60 from its rest position toward its depressed position, drive crank 103 is rotated in a counterclockwise direction, moving second crank arm 200 rearwardly and drawing link 196 rearwardly. Carriage 192 is thus drawn toward a table 202 located at the printing station 62, the nose 190 being guided by a slot 204 in the sub-frame 180. The label strip 46 passes over table 202 in the printing station 62 and, since the tape 48 is narrower than the label strip 46 (see FIGS. 5 and 8) the face of the label 12 at the printing station is presented to the selected printing elements 186 located at the nose 190 of the carriage 192. As the actuating lever 60 reaches the fully depressed position, the selected printing elements 186 are pressed against the face of the label.

During movement of the carriage 192 from the rest position to the printing position, the selected printing elements 186 are inked by an ink roller 206 which is carried by a carrier 208 pivoted upon sub-frame 180 at 210. A cam surface 212 of the carrier 208 is resiliently urged against a driver 214 on the carriage 192 by a spring 216. As the carriage 192 moves from the rest position to the printing position the driver 214 traverses the cam surface 212 and the carrier 208 moves from the full-line position to the phantom position, as illustrated in FIG. 10, to run the ink roller 206 across the selected printing elements 186 and thereby ink the printing elements.

As best seen in FIGS. 8 and 9, link 196 carries a rack 220 which is meshed with a pinion 222 carried by a shaft 224 which also carries the take-up reel 76. As the link 196 is drawn rearwardly, the rack 220 will rotate the pinion 222 and the take-up reel 76 will be rotated to take-up the used strip 48.

It is noted that the scribing of the code bars 20, 22 and 24, the impact printing of the characters 26 and the ink printing of the characters 36, as well as the incremental advancement of the label strip 46, the tape 48 together with the supplemental feed of the web 52, and the take-up of the used tape 48 are all accomplished by movement of the actuating lever 60 from its rest position to its fully depressed position. Thus, the actuating force applied to the actuating lever 60 is transmitted directly to the performance of all of the several functions set forth above.

Upon release of the actuating lever 60, helical spring 61 will return the actuating lever 60 to the rest position delineated by the actuating lever coming to rest against stop post 132. The drive shaft 100 will rotate in a clockwise direction, as viewed in FIG. 4, returning drive cranks 102 and 103 and further crank 150 to the positions illustrated in FIG. 4. Latch tooth 160 will ride over the lower surface 230 of the hammer 162 and once again assume the position where the latch tooth 160 will engage the front face 232 of the hammer 162 for subsequent cocking of the hammer. Link 110 will return to the forward position, forward movement of the link 110 and the rack 114 causing the pinion 116 to rotate in a clockwise direction, as viewed in FIG. 4. A one-way clutch 234 (see FIG. 8) prevents rotation of feed roller 72 in a clockwise direction in response to the free-running rotation of pinion 116. Likewise, rotation of the take-up reel 76 by forward movement of link 196 and rack 220 is precluded by a one-way clutch 236 which enables free counterclockwise rotation of pinion 222.

In the full cycle of operation of the label marking device 42, the sequence of operation is such that the scribing of the code bars 20, 22 and 24 takes place during one portion of the cycle and the impact printing of the characters 26 takes place during a subsequent portion of the cycle. The ink printing of the characters 36 takes place essentially during the same portion of the cycle of operation as the impact printing of characters 26.

It will be evident from the illustration in FIG. 4 that upon initial movement of actuating lever 60 from the rest position toward the depressed position, link 110 will move rearwardly to effect actuation of the feed rollers 70 and 72 and advancement of the label strip 46 and tape 48; however, since cam surfaces 106 initially are spaced slightly from cam followers 130, the initial advancement of strip 46 and tape 48 takes place without the platen roller 86 being pressed toward the selected scribe elements 82. Thus, no scribing takes place initially and the area 32 of each advanced label 12 remains free of scribed code bars and available for subsequent impact printing of characters 26.

Label marking device 42 is relatively compact in view of the fact that the device is hand-held and is to be operated manually with only one hand. In addition, the size of label 12 preferably is no larger than labels previously employed only for price information, enabling the use of currently available label stock. Thus, symbol 14 is relatively small and calls for a concomitantly small mechanism for scribing the code bars of the symbol.

Returning now to FIGS. 3 through 7, scribe elements 80 are carried by a compact scribing mechanism 240 mounted upon the frame 44 of label marking device 42. Scribing mechanism 240 includes a plurality of bar code character wheels 242 mounted side-by-side for rotation about a common axis of rotation upon a first fixed arbor 244. Each character wheel 242 has a plurality of radially projecting tooth-like lobes 246, each lobe 246 having a crown 248 upon which there is located scribe elements 80 providing a bar code character representation representing a particular bar code character. Since the bar code characters each have a different arrangement of modules, the arrangement of the scribe elements 80 will be different on each lobe; however, as best seen in FIGS. 4A and 4B, each lobe carries a complete set of scribe elements for scribing a complete bar code character. Because the relative location of the bar code characters in a symbol 14 is critical, and is fixed by the standards prescribed for the symbol, bar code character wheels 242 are arranged in an array which enables the selection of individual bar code characters without upsetting the critical relationship among the selected characters of the symbol. Thus, character wheels 242 are contiguous with one another and are confined axially to preclude variations in axial location of the character wheels. Fixed plates 250 and 252 are provided at the ends of the array of character wheels 242, plate 250 having a lobe 254 which carries scribe elements 256 corresponding to the left-hand guard bars 20 and plate 252 having a lobe 258 which carries scribe elements 260 corresponding to the right-hand guard bars 22.

In order to place the selected scribe elements 82 at the appropriate first location 84 in the printing station 62, bar code character wheels 242 may be rotated on arbor 244 to index each wheel. A detent in the form of a spring-biased ball 262 cooperates with a corresponding groove 264 located at each selectable position within each wheel 242 to retain each wheel in a selected position. A plurality of selectors in the form of selector wheels 266, corresponding to the number of bar code character wheels 242, are mounted side-by-side for rotation about a common second axis of rotation upon a second arbor 268. Each selector wheel 266 has a plurality of recesses 270, the number of recesses 270 corresponding to the number of lobes 246 on the bar code character wheels 242, and the recesses 270 being generally complementary to the lobes 246 and each having a bottom 271. The arbors 244 and 268 are located relative to one another such that the lobes 246 of a bar code character wheel 242 can enter the recesses 270 of a corresponding selector wheel 266 in a manner similar to the meshing of gears.

Between the recesses 270 of the selector wheels 266 are tooth-like lobes 272 corresponding in number to the number of lobes 246 on the bar code character wheels 242. These lobes 272 carry visible operator-readable alpha-numeric character representations on the crowns 274 thereof. The bar code character wheels 242 have recesses 276 between lobes 246 for receiving the lobes 272 of the selector wheels 266.

Figure 7:
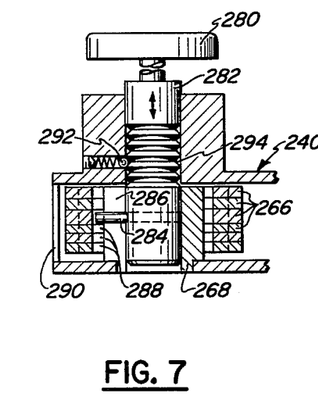
FIG. 7 is a fragmentary cross-sectional view taken along line 7—7 of FIG. 4.

As best seen in FIGS. 4, 5 and 7, a selector knob 280 is carried by a selector shaft 282 received within the arbor 268 upon which the selector wheels 266 are mounted. Selector shaft 282 carries a drive pin 284 which passes through a longitudinal slot 286 in arbor 268 and enters a notch 288 in a selector wheel 266. Rotation of selector knob 280 and selector shaft 282 will index the particular selector wheel 266 engaged by the drive pin 284, with concomitant indexing of the corresponding bar code character wheel 242 by virtue of the engagement of lobes 246 and recesses 270. When a particular selected alpha-numeric character representation on the selector wheel is juxtaposed with an indicator bar 290, as determined by visual observation in the direction of arrow 291 in FIGS. 4 and 5, the corresponding selected scribe elements 82 will be in position at the printing station 62 for scribing the desired code bars. Selector shaft 282 may be indexed axially to any one of several axial positions, as determined by the cooperation of detent ball 292 with a groove 294 in the selector shaft, to enable rotation of any selector wheel 266 to set any corresponding bar code character wheel 242.

The selection of the print elements 92 to be placed at the second location 94 in the printing station 62 is accomplished simultaneous with the selection of the desired bar code characters. As best seen in FIGS. 4, 4C and 6, a plurality of print wheels 300 are mounted for rotation about a common third axis of rotation upon a third arbor 302. Each print wheel 300 has a plurality of tooth-like lobes 304, each of which carries a raised print element 92 providing an alpha-numeric representation on the crest 306 of each lobe 304. Third arbor 302 is located so as to bring the lobes 304 into mesh with the recesses 276 between the lobes of the bar code character wheels 242. Thus, the selected position of each bar code character wheel 242 will determine the position of each corresponding print wheel 300.

As best seen in FIGS. 4A and 4C, the configuration of the lobes 246, 272 and 304 and the configuration of the recesses within which the lobes are received are such that sufficient spacing is provided between the crest of each lobe and the bottom of the recess within which the lobe is received to preclude damage to the elements carried on the crests of the lobes by any contact between the respective elements and the bottoms of the recesses. Thus, a clearance space is provided at 310 in FIG. 4A and at 312 in FIG. 4C.

In the illustrated embodiment of the invention, label marking device 42 marks labels 12 with the zero-suppression version of the UPC symbol. Thus, symbol 14 is provided with six bar code characters and six corresponding alpha-numeric characters. The scribing mechanism 240 therefore includes six bar code character wheels 242, together with six corresponding selector wheels 266, and there are six print wheels 300. Since label marking device 42 must be capable of placing a bar code character representing any one of ten values in either odd or even parity code at each of the six character positions, each bar code character wheel 242 is provided with twenty lobes 246, providing twenty bar code characters. The twenty bar code characters represent the values zero to nine in each of the odd and even parity codes. The selector wheels 266 have twenty lobes 272 carrying operator-readable alpha-numeric representations in the form of numerals in two sets of zero to nine. The two sets are distinguishable from one another, preferably by visual appearance. Thus, the set of numerals corresponding to one parity may be of one color while the set of numerals corresponding to the other parity may be of another color. Other distinguishing features such as style or added character symbols could be used to distinguish the numerals corresponding to odd and even parity.

By placing the bar code characters of each set in sequence on consecutive lobes 246 around the periphery of a bar code character wheel 242, the print wheels 300 need only have ten lobes 304, since the actual values zero through nine are the same for both the odd and even parities.

Thus, the above arrangement for scribing the bar code characters and impact printing the corresponding alpha-numeric characters provides a compact device for marking the full range of characters in the symbol 14 upon the label 12. With only six bar code character wheels 242 and six print wheels 300, label marking device 42 is capable of marking all of the variations in bar code characters, in both odd and even parity code, necessary for the zero-suppression version of the UPC symbol. And all of the above is attained in a compact, hand-held, manually operated device.

It is to be understood that the above detailed description of an embodiment of the invention is provided by way of example only. Various details of design and construction may be modified without departing from the true spirit and scope of the invention as set forth in the appended claims.

The embodiment of the invention in which an exclusive property or privilege is claimed are defined as follows:

1. A label marking device for printing selected bar code and alpha-numeric character information upon a label, said device comprising:
    a frame;
    a printing station on the frame;
    a supply of labels;
    a printing medium;
    a plurality of scribe elements mounted on the frame for location of selected scribe elements, corresponding to selected bar code character information, at a first location at the printing station;
    a plurality of print elements mounted on the frame for location of selected print elements, corresponding to selected alpha-numeric character information, at a second location at the printing station, the second location being adjacent to and spaced from the first location;
    pressure means mounted on the frame for placement at the first location;
    impact means mounted on the frame for placement at the second location; and
    actuating means on the frame capable of actuation through a cycle of operation for moving a label, from the supply, together with a portion of the printing medium juxtaposed with the label, between the pressure means and the selected scribe elements at the first location while urging the pressure means to press and continue to urge the juxtaposed label and printing medium against the scribe elements while the scribe elements remain stationary so as to scribe information on the label in the form of a bar code having code bars running parallel to the direction of movement of the label as a result of such movement of the label relative to the scribe elements during a first portion of said cycle, and actuating the impact means to impact the juxtaposed label and printing medium momentarily with the selected print elements at the second location so as to print information on the same label corresponding to said selected alpha-numeric characters during a second portion of said cycle.

2. The invention of claim 1 wherein the scribe elements and print elements are coupled, such that the selection of elements at one of said first and second locations results in the selection of corresponding elements at the other of said first and second locations.

3. The invention of claim 2 wherein:
    the supply of labels is in a strip of indeterminate length;
    the printing medium is in a tape of indeterminate length;
    the pressure means includes a platen mounted upon the frame for movement toward and away from the scribe elements;
    the impact means includes a striker mounted upon the frame for movement toward and away from the print elements;
    the strip and the tape each follow a prescribed path of travel along the frame, the paths of travel being juxtaposed at said first and second locations and passing between the scribe elements and the platen at the first location, and between the print elements and the striker at the second location; and
    the actuating means includes
    feed means for advancing the strip and the tape along the respective paths of travel through the printing station;
    camming means for urging the platen toward the selected scribe elements so as to press the strip and the tape against one another and against the scribe elements during actuation of the feed means; and
    hammer means for striking the striker to drive the striker toward the selected print elements to impact the strip and the tape against the selected print elements.

4. The invention of claim 3 wherein the actuating means further includes:
    an actuating lever movable between a first position and second position; and
    coupling means coupling the actuating lever with the feed means such that the juxtaposed strip and tape are advanced through an increment of advancement during movement of the actuating lever from the first position toward the second position;

the camming means being actuated in response to movement of the actuating lever to urge the platen toward the scribe elements as the strip and tape are advanced through at least a portion of the increment of advancement; and the hammer means being actuated to strike the striker while the strip and tape are stationary.

5. The invention of claim 4 wherein the hammer means is actuated to strike the striker upon completion of said increment of advancement.

6. The invention of claim 5 wherein the hammer means includes:

a hammer for striking the striker; and means resiliently biasing the hammer toward the striker;

the hammer means being coupled with the actuating lever such that the resilient biasing means is cocked during movement of the actuating lever from the first position toward the second position and is released to actuate the hammer to strike the striker as the actuating lever reaches the second position.

7. The invention of claim 6 wherein the first position of the actuating lever is a rest position and the second position is a depressed position, whereby the increment of strip and tape is advanced, the camming means is actuated to urge the platen toward the scribe elements and the hammer means is actuated to strike the striker, all as the actuating lever is being depressed.

8. The invention of claim 7 wherein the camming means urges the platen toward the scribe elements subsequent to the commencement of the advancement of the strip and tape through said increment such that an area of each label is free of scribed code bars adjacent the corresponding ends of the scribed code bars, said area being located at the second location upon actuation of the hammer means to strike the striker.

9. The invention of claim 8 including:

an alpha-numeric printing mechanism mounted for reciprocating movement upon the frame between a first position away from the printing station and a second position located at a third location at the printing station; and further coupling means coupling the printing mechanism for movement between said first and second positions in response to movement of the actuating lever;

a further area of each advanced label being located at the third location to be engaged by the printing mechanism upon movement of the printing mechanism to the second position thereof for printing further alpha-numeric character information upon said further area.

10. The invention of claim 9 wherein the further coupling means couples the printing mechanism for movement from the first position toward the second position thereof as the actuating lever is depressed from the rest position toward the depressed position.

11. The invention of claim 1 including:

a plurality of bar code character wheels mounted side-by-side on the frame for rotation about a common first axis to enable selective indexing of each wheel, each bar code character wheel carrying a plurality of said scribe elements along the periphery of the wheel, whereby indexing of each wheel enables selection of particular scribe elements providing a representation of a particular bar code character;

each bar code character wheel having a plurality of tooth-like first lobes spaced around the periphery of the wheel, the number of first lobes corresponding to the number of bar code character representations, each lobe having a crown and each bar code character representation being located upon the crown of a first lobe; and a plurality of selectors mounted side-by-side on the frame for movement adjacent the bar code character wheels, the number of selectors corresponding to the number of bar code character wheels, each selector having a plurality of first recesses, each first recess having a bottom, the number of first recesses in each selector corresponding to the number of first lobes on each bar code character wheel, the first recesses being generally complementary to the first lobes such that the first lobes are received within the first recesses to enable indexing of each bar code character wheel by movement of a corresponding selector;

each selector carrying viewable alpha-numeric character representations corresponding to the bar code characters represented on the corresponding bar code character wheel.

12. The invention of claim 11 wherein the spacing between the crown of each first lobe and the bottom of each first recess is sufficient to preclude damage to the scribe elements on a first lobe by contact with the bottom of the first recess engaged by the first lobe.

13. The invention of claim 11 wherein the bar code character information to be printed upon the label is in accordance with the zero-suppression version of the UPC symbol wherein a modulo check character value is obtained through a specific odd and even parity pattern among the characters of the symbol and each bar code character wheel has twenty first lobes carrying twenty bar code character representations representing ten character values each in odd and even parities.

14. The invention of claim 11 wherein:

the selectors comprise selector wheels each having a plurality of tooth-like second lobes spaced around the periphery of the selector wheel, the number of second lobes corresponding to the number of alpha-numeric character representations on the selectors, each second lobe having a crown and each alpha-numeric character representation being located upon the crown of a second lobe;

the selector wheels are mounted for rotation about a common second axis parallel to the first axis;

the first recesses are located between adjacent second lobes of each selector wheel; and second recesses are located between adjacent first lobes of each character wheel, the second recesses being generally complementary to the second lobes of the selector wheels such that the second lobes of each selector wheel are received within the second recesses during rotation of the selector wheels and bar code character wheels.

15. The invention of claim 14 wherein the spacing between the crown of each lobe and the bottom of a corresponding recess is sufficient to preclude damage to the character representation on a lobe by contact with the bottom of a corresponding recess engaged by that lobe.

16. The invention of claim 14 wherein the bar code character information to be printed upon the label is in accordance with the zero-suppression version of the UPC symbol wherein a modulo check character value is obtained through a specific odd and even parity pattern among the characters of the symbol, each bar code character wheel has 20 first lobes carrying twenty bar code character representations representing 10 character values each in odd and even parities, and each selector wheel has 20 second lobes carrying 20 alpha-numeric character representations representing 10 character values each in odd and even parities, each selector wheel including means for visibly distinguishing between the odd and even parities.

17. The invention of claim 11 including:
a plurality of alpha-numeric character wheels mounted side-by-side on the frame for rotation about a common third axis parallel to the first axis to enable selective indexing of each wheel, each alpha-numeric character wheel carrying a plurality of said print elements along the periphery of the wheel, whereby indexing of each wheel enables selection of a particular print element providing a representation of a particular alpha-numeric character value;
each alpha-numeric character wheel having a plurality of tooth-like third lobes spaced around the periphery of the wheel, the number of third lobes corresponding to the number of alpha-numeric character representations on the wheel, each third lobe having a crown and each alpha-numeric character representation being located upon the crown of a third lobe; and
third recesses located between adjacent third lobes of each alpha-numeric character wheel, the third recesses being generally complementary to the first lobes of each bar code character wheel such that the first lobes of each bar code character wheel are received within the third recesses during rotation of the bar code character wheels.

18. The invention of claim 17 wherein the spacing between the crown of each lobe and the bottom of a corresponding recess is sufficient to preclude damage to the character representation on a lobe by contact with the bottom of a corresponding recess engaged by that lobe.

19. The invention of claim 17 wherein the bar code character information to be printed upon the label is in accordance with the zero-suppression version of the UPC symbol wherein a modulo check character is obtained through a specific odd and even parity pattern among the characters of the symbol, each bar code character wheel has 20 first lobes carrying twenty bar code character representations representing 10 character values each in odd and even parities, and each alpha-numeric character wheel has 10 third lobes carrying 10 alpha-numeric character representations representing the 10 character values.

20. In a label marking device having elements for printing selected bar code character information upon a label in accordance with a prescribed standard symbol:
a plurality of bar code character wheels mounted side-by-side for rotation about a common first axis to enable indexing of each wheel for the selection of a particular bar code character, each bar code character wheel having a plurality of first elements providing bar code character representations located along the periphery of the wheel;
each bar code character wheel having a plurality of tooth-like first lobes spaced around the periphery of the wheel, the number of first lobes corresponding to the number of bar code character representations on the wheel, each first lobe having a crown and each bar code character representation being located upon the crown of a first lobe;
a plurality of selector wheels mounted side-by-side for rotation adjacent the bar code character wheels, the number of selector wheels corresponding to the number of character wheels, each selector wheel having a plurality of first recesses, each first recess having a bottom, the number of first recesses in each selector wheel corresponding to the number of first lobes on each bar code character wheel, the first recesses being generally complementary to the first lobes such that the first lobes are received within the first recesses to enable indexing of each bar code character wheel by rotation of a corresponding selector wheel;
each selector wheel carrying viewable alpha-numeric character representations corresponding to the bar code characters represented on the corresponding bar code character wheel and having a plurality of tooth-like second lobes spaced around the periphery of the selector wheel, the number of second lobes corresponding to the number of alpha-numeric character representations on the selector wheels, each second lobe having a crown and each alpha-numeric character representation being located upon the crown of a second lobe;
the selector wheels being mounted for rotation about a common second axis parallel to the first axis;
the firt recesses being located beween adjacent second lobes of each selector wheel; and
second recesses located between adjacent first lobes of each character wheel, the second recesses being generally complementary to the second lobes of the selector wheels such that the second lobes of each selector wheel are received within the second recesses during rotation of the selector wheels and bar code character wheels;
the spacing between the crown of each lobe and the bottom of a corresponding recess being sufficient to preclude damage to the character representation on a lobe by contact with the bottom of a corresponding recess engaged by that lobe.

21. The invention of claim 20 wherein the standard symbol is the zero-suppression version of the UPC symbol wherein a modulo check character value is obtained through a specific odd and even parity pattern among the characters of the symbol, each bar code character wheel has 20 first lobes carrying 20 bar code character representations representing 10 character values each in odd and even parities, and each selector wheel has 20 second lobes carrying 20 alpha-numeric character representations representing 10 character values each in odd and even parities, each selector wheel including means for visibly distinguishing between the odd and even parities.

22. The invention of claim 20 wherein the label marking device prints alpha-numeric character information corresponding to the selected bar code character information, the device including:
a plurality of alpha-numeric character wheels mounted side-by-side for rotation about a common third axis parallel to the first axis to enable indexing of each alpha-numeric character wheel for the selection of a particular alpha-numeric character, each alpha-numeric character wheel having a plurality of second elements providing alpha-numeric character representations located along the periphery of the wheel, each alpha-numeric character representation representing a particular character value;

each alpha-numeric character wheel having a plurality of tooth-like third lobes spaced around the periphery of the wheel, the number of third lobes corresponding to the number of alpha-numeric character representations on the wheel, each third lobe having a crown and each alpha-numeric character representation being located upon the crown of a third lobe; and third recesses located between adjacent third lobes of each alpha-numeric character wheel, the third recesses being generally complementary to the first lobes of each bar code character wheel such that the first lobes of each bar code character wheel are received within the third recesses during rotation of the bar code character wheels.

23. The invention of claim 22 wherein the standard symbol is the zero-suppression version of the UPC symbol wherein a modulo check character value is obtained through a specific odd and even parity pattern among the characters of the symbol, each bar code character wheel has 20 first lobes carrying twenty bar code character representations representing 10 character values each in odd and even parities, and each alpha-numeric character wheel has 10 third lobes carrying 10 alpha-numeric character representations representing the 10 character values.

* * * * *